UNITED STATES PATENT OFFICE.

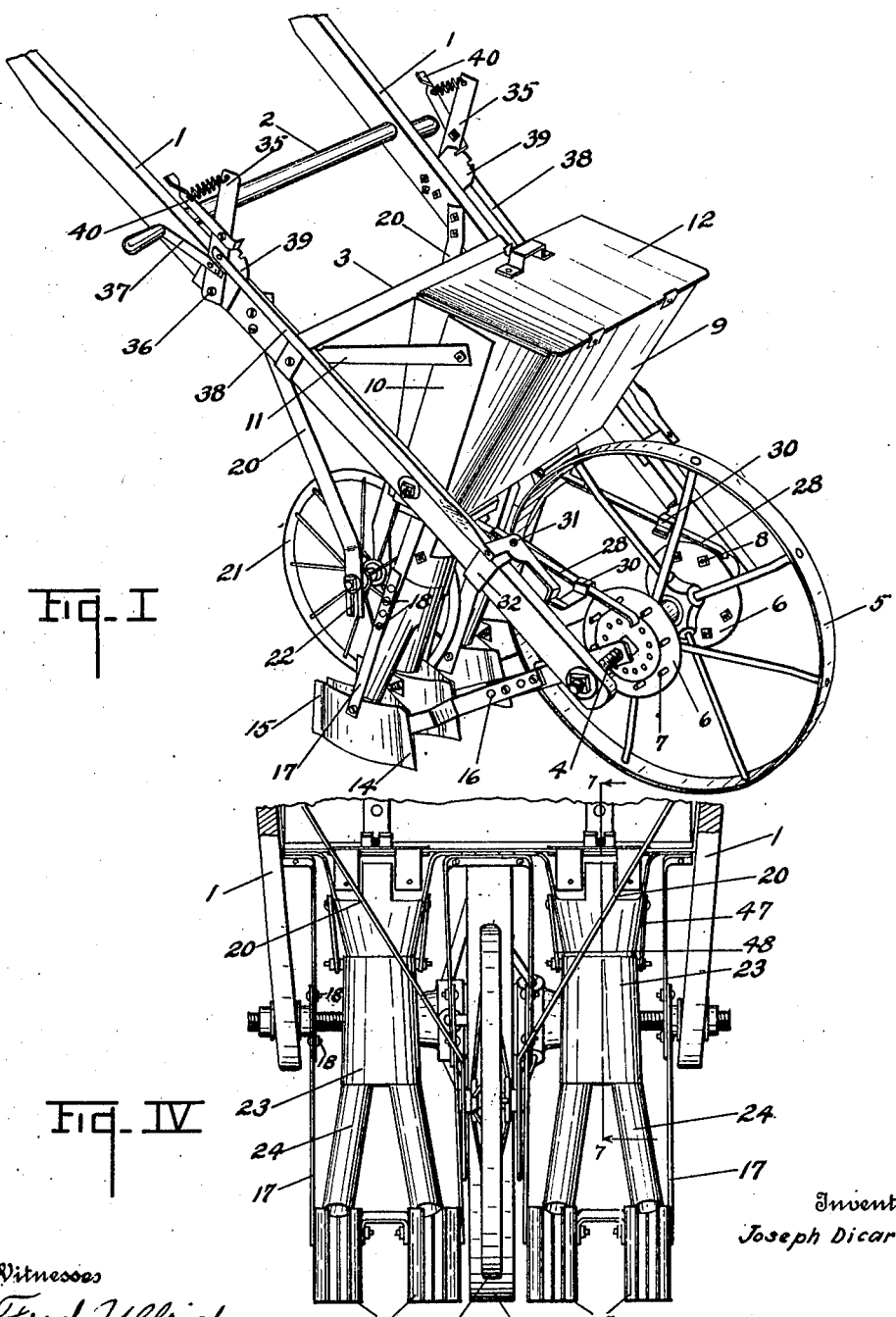

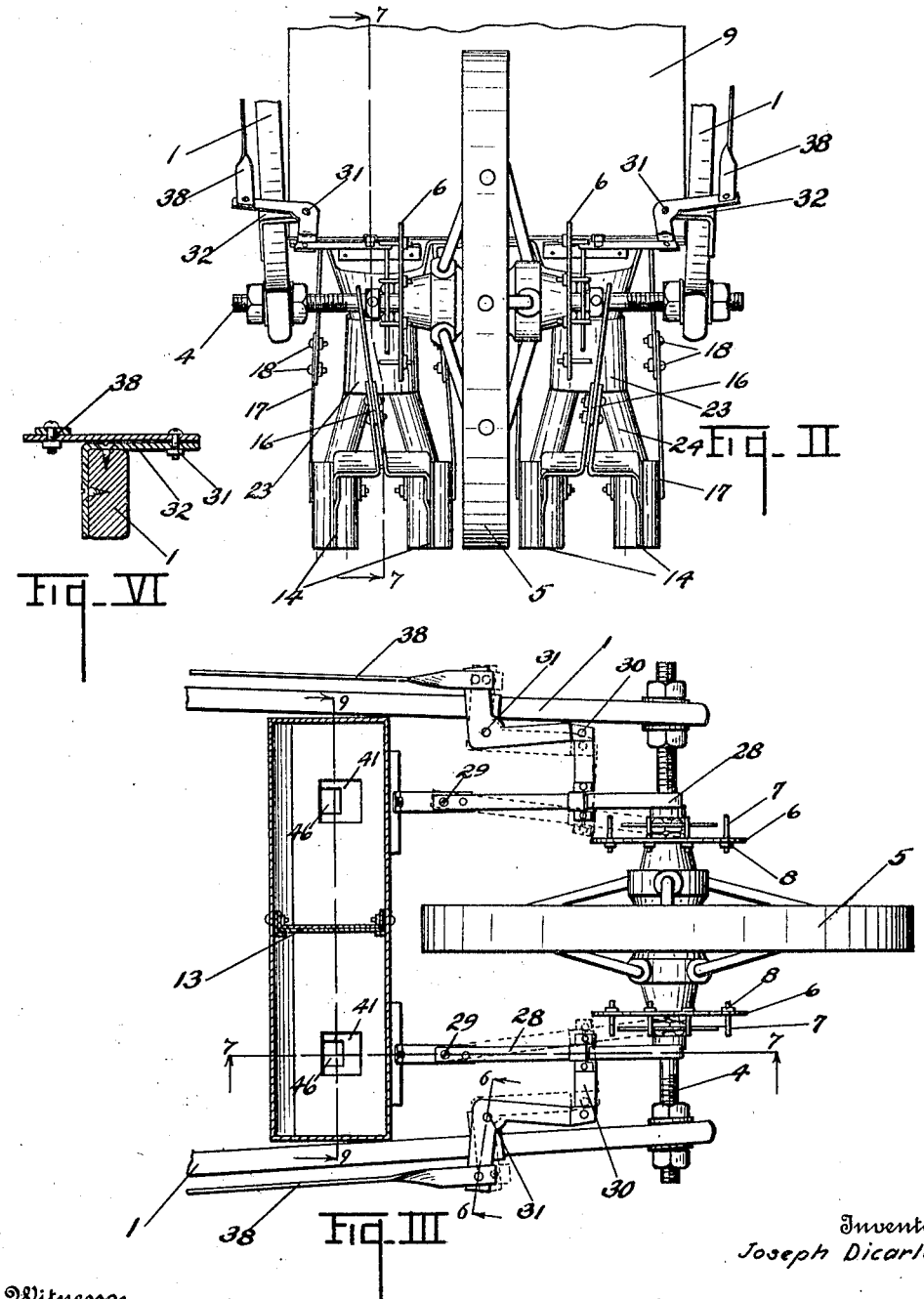

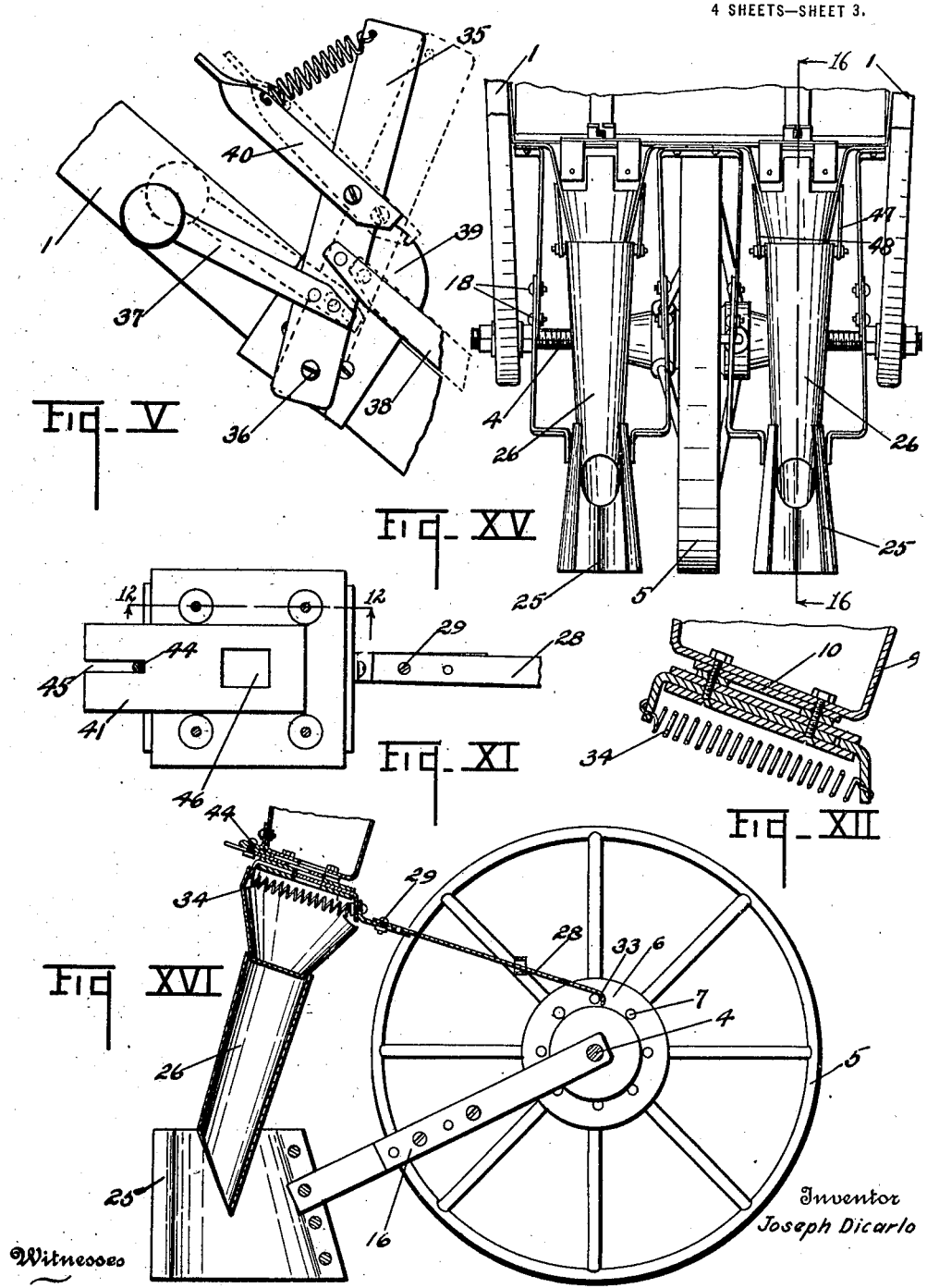

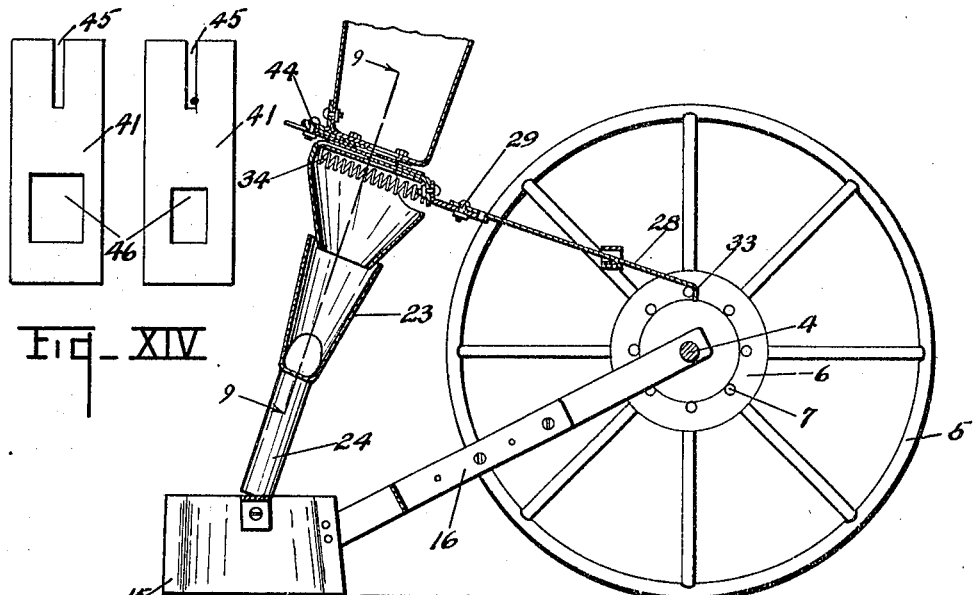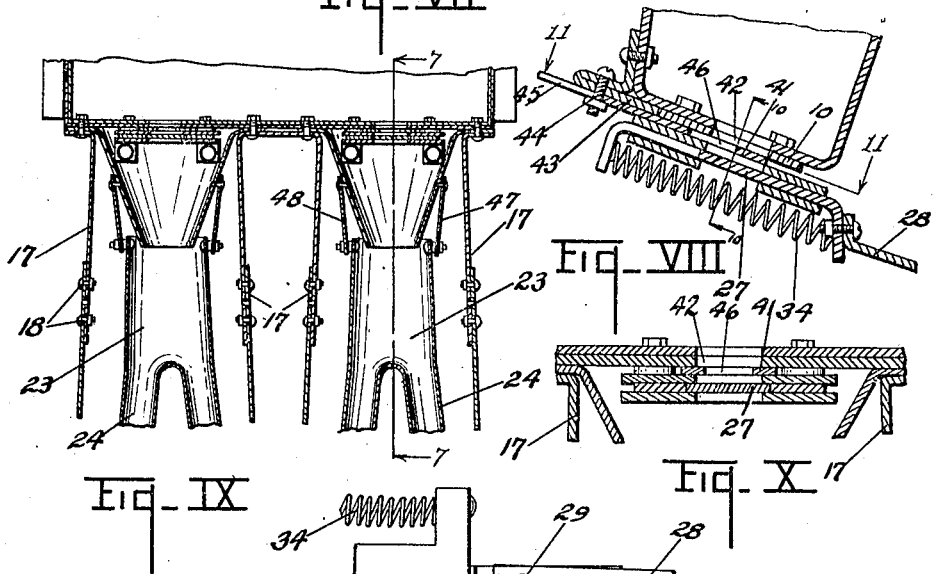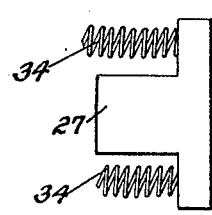

JOSEPH DICARLO, OF KALAMAZOO, MICHIGAN.

WALKING DRILL OR PLANTER.

1,298,674.      Specification of Letters Patent.      Patented Apr. 1, 1919.

Application filed August 8, 1918. Serial No. 248,848.

*To all whom it may concern:*

Be it known that I, JOSEPH DICARLO, a citizen of the United States, residing at Kalamazoo, Michigan, have invented certain new and useful Improvements in Walking Drills or Planters, of which the following is a specification.

This invention relates to improvements in walking drills or planters.

The main objects of this invention are:

First, to provide an improved walking drill or planter which may be conveniently adjusted or adapted to drill small seeds or grains such as wheat in rows, or plant other grains or seeds such as corn or beans in hills.

Second, to provide an improved walking drill or planter having these advantages which may be quickly adjusted to the particular needs and one which is easy to operate.

Third, to provide an improved walking drill or planter which is comparatively simple and economical in structure and at the same time strong and durable.

Further objects, and objects relating to details and economies of construction and operation, will definitely appear from the detailed description to follow.

I accomplish the objects of my invention by the devices and means described in the following specification. The invention is clearly defined and pointed out in the claims.

A structure constituting a preferred embodiment of my invention is illustrated in the accompanying drawing forming a part of this specification, in which:

Figure I is a perspective view of a structure embodying the features of my invention, the handles being broken away.

Fig. II is a detail front elevation.

Fig. III is a detail plan view, the hopper being shown in horizontal section.

Fig. IV is a detail rear view showing the arrangement of the furrow opener, grain spouts, and gage wheel.

Fig. V is an enlarged detail side elevation illustrating the arrangement of the adjusting levers for the feed mechanism actuating bars.

Fig. VI is a detail section on a line corresponding to line 6—6 of Fig. III, showing the mounting for the tappet bar supports.

Fig. VII is a detail vertical section on a line corresponding to line 7—7 of Figs. II, III and IX.

Fig. VIII is an enlarged detail vertical section through the feed mechanism, the section corresponding to Fig. VII.

Fig. IX is a transverse section through the feed mechanism on a line corresponding to line 9—9 of Fig. VII.

Fig. X is an enlarged detail transverse section through the feed mechanism corresponding to that of Fig. IX.

Fig. XI is a detail horizontal section through the feed mechanism on a line corresponding to line 11—11 of Fig. VIII.

Fig. XII is a detail section on a line corresponding to line 12—12 of Fig. XI.

Fig. XIII is a plan view of the feed slides, showing connections of the springs thereto.

Fig. XIV is a plan view of a pair of feed adjusting plates for different seeds.

Fig. XV is a detail rear view of a modification in which a pair of single furrow openers are provided instead of the double furrow openers and branch seed chutes of the previous figures.

Fig. XVI is a detail vertical section on a line corresponding to line 16—16 of Fig. XV.

In the drawing similar reference characters refer to similar parts throughout the several views, and the sectional views are taken looking in the direction of the little arrows at the ends of the section lines.

Referring to the drawing, I provide a frame comprising side members 1 connected by suitable cross pieces 2 and 3 and carrying an axle 4 at their front ends, the axle also constituting a cross piece for the frame. The frame and side members are extended into handles, the grips of the handles being broken away in Fig. I.

The main wheel 5 is rotatably mounted on the axle and is provided with a pair of tappet disks 6 having tappet pins 7 projecting laterally therefrom. These tappet pins are secured by nuts 8 on the inside of the disks so that the pins may be removed as occasion requires.

The hopper 9 is mounted between the side members, being carried by the side plates 10 which are braced at 11. The hopper is provided with a cover 12 in the structure illustrated and has a partition 13 therein.

The furrow openers 14, illustrated, are of a pair of diverging plates 15 secured together at their front edges and connected to the draw bars 16. These draw bars are pivotally mounted on the axle.

The furrow opener hanger bars 17 are secured to the bottom of the hopper and to the furrow openers, the hanger bars being made of sections adjustably connected by the bolts 18 so that the furrow openers may be adjusted vertically.

At the rear of the hopper there is a standard 20 for the gage wheel 21. The spindle of this gage wheel is adjustably secured in slots 22 in the lower end of the standard 20 so that the gage wheel may be vertically adjusted.

In the embodiment shown in Fig. I, the furrow openers are arranged in pairs and the seed chutes or conduits 23 are branched, one branch fork 24 delivering between the plates of each furrow opener.

In the modification shown in Figs. XV and XVI, the single furrow openers 25 are provided with feed spouts or chutes 26 delivering thereto, the same as the branch chutes of the structure of Fig. I.

I provide a feed mechanism comprising dropping slides 27 to which tappet bars 28 are pivotally connected at 29. The front ends of these tappet bars are slidably supported by the supports 30 which are pivoted at 31 on brackets 32 carried by the side members. By swinging these supports, the tappet bars, which have hooks 33 at their forward ends, are brought into and out of coacting relation with the tappet pins. Return springs 34 are provided for the feed slides.

The tappet bars are adjusted by the levers 35 pivoted at 36 and provided with handles 37, the levers being connected to the supports by means of links 38. Holding segments 39 are provided to coact with the bolts or detent 40 on the levers. The levers are positioned so that the operator may adjust the same from his position between the handles.

To regulate the feed means, I provide an adjustable plate 41 arranged so as to coact with the openings 42 in the bottom of the hopper, and the fixed plate 43. The plates 41 are adjustably secured by the bolts 44, engaging slots 45 therein, so that the plates may be adjusted to bring their openings 46 more or less into register with the openings 42 and the opening 45 in the support for the slide 27. To further regulate the feed, I provide plates having different sized openings 46, as shown in Fig. XIV.

The furrow openers are interchangeable as are also the feed chutes, as described, the feed chutes being supported on the hanger straps 47 and 48 so that little time is required to make the desired change.

My improved planter or drill is well adapted for the drilling of small grains or seeds in rows and larger grains or seeds in hills, as may be desired, the spacing being regulated by the tappet pins.

In the structure illustrated, the wheel 5 is four feet in circumference so that by removing all the pins except one, hills might be made four feet apart as a maximum.

Having thus described my invention, what I claim as new and desire to secure by Letters Patent is:

1. In a walking planter or drill, the combination of a main wheel, an axle on which said wheel is rotatably mounted, a frame comprising side members on the front end of which said axle is mounted, said side members constituting handles, a hopper mounted between said side members at the rear of said main wheel, a gage wheel adjustably mounted on standards, furrow openers, draw bars therefor pivoted on said axle, adjustable hanger bars for said furrow openers, grain chutes delivering into the furrow openers, feed mechanisms comprising dropping slides, tappet disks mounted on each side of said main wheel and provided with laterally projecting tappet pins, tappet bars pivotally connected to said feed slides and having hooks at their forward ends adapted to coact with said tappet pins, return springs for said dropping slides, supports on which the front ends of the tappet bars are slidably mounted, said supports being pivotally mounted on said side members, adjusting levers for said supports mounted on said side members at the rear of the hopper and provided with detents, and links connecting said supports to said levers whereby said supports may be independently adjusted to swing the tappet bars to and from their operative positions.

2. In a walking planter or drill, the combination of a main wheel, an axle on which said wheel is rotatably mounted, a frame comprising side members on the front end of which said axle is mounted, said side members constituting handles, a hopper at the rear of said main wheel, a gage wheel adjustably mounted on standards, furrow openers, draw bars therefor pivoted on said axle, adjustable hanger bars for said furrow openers, grain chutes delivering into the furrow openers, feed mechanisms comprising dropping slides, tappet disks mounted on each side of said main wheel and provided with laterally projecting tappet pins, tappet bars pivotally connected to said feed slides and having hooks at their forward ends adapted to coact with said tappet pins, return springs for said dropping slides, and adjustable supports on which the front ends of the tappet bars are slidably mounted.

3. In a walking planter or drill, the combination of a main wheel, an axle therefor, a frame provided with handles, a hopper mounted at the rear of said main wheel, furrow openers, grain chutes, feed mechanisms, tappet disks mounted on each side of said main wheel provided with laterally projecting tappet pins, tappet bars connected to said feed mechanism and adapted to coact with said tappet pins, return springs for said feed mechanisms, adjustable supports on which the front ends of the tappet bars are slidably mounted, adjusting levers for said supports mounted on said side members at the rear of the hopper and provided with detents, and links connecting said supports to said levers whereby said supports may be independently adjusted to swing the tappet bars to and from their operative positions.

4. In a walking planter or drill, the combination of a main wheel, an axle therefor, a frame provided with handles, a hopper mounted at the rear of said main wheel, furrow openers, grain chutes, feed mechanisms, tappet disks mounted on each side of said main wheel provided with laterally projecting tappet pins, tappet bars connected to said feed mechanism and adapted to coact with said tappet pins, return springs for said feed mechanisms, adjustable supports on which the front ends of the tappet bars are slidably mounted, adjusting levers for said supports mounted at the rear of the hopper and provided with detents, and links connecting said supports to said levers whereby said supports may be independently adjusted to swing the tappet bars to and from their operative positions.

5. In a walking planter or drill, the combination of a main wheel, an axle therefor, a frame provided with handles, a hopper, furrow openers, grain chutes, feed mechanisms, tappet disks mounted on each side of said main wheel provided with laterally projecting tappet pins, tappet bars connected to said feed mechanism and adapted to coact with said tappet pins, return springs for said feed mechanisms, and adjustable supports on which the front ends of the tappet bars are slidably mounted.

6. In a walking planter or drill, the combination of a main wheel, an axle on which said wheel is rotatably mounted, a frame comprising side members on the front end of which said axle is mounted, said side members constituting handles, a hopper mounted between said side members at the rear of said main wheel, a furrow opener, a draw bar therefor pivoted on said axle, an adjustable hanger bar for said furrow opener, a grain chute, a feed mechanism, a tappet disk mounted on said main wheel and provided with laterally projecting tappet pins, a tappet bar connected to said feed mechanism and adapted to coact with said tappet pins as the wheel revolves, a return spring for said feed mechanism, a pivoted support on which the front end of the tappet bar is slidably mounted, an adjusting lever for said support mounted on one of said side members at the rear of the hopper and provided with a detent, and a link connecting said support to said lever whereby said support may be adjusted to swing the tappet bar to and from its operative position.

7. In a walking planter or drill, the combination of a main wheel, an axle on which said wheel is rotatably mounted, a frame comprising side members on the front end of which said axle is mounted, said side members constituting handles, a hopper, a furrow opener, a draw bar therefor pivoted on said axle, an adjustable hanger bar for said furrow opener, a grain chute, a feed mechanism, a tappet disk mounted on said main wheel and provided with laterally projecting tappet pins, a tappet bar connected to said feed mechanism and adapted to coact with said tappet pins as the wheel revolves, a return spring for said feed mechanism, and an adjustable support on which the front end of the tappet bar is slidably mounted.

8. In a walking planter or drill, the combination of a main wheel, an axle on which said wheel is rotatably mounted, a frame comprising side members on the front end of which said axle is mounted, said side members constituting handles, a hopper mounted between said side members at the rear of said main wheel, a gage wheel standard depending from said side members at the rear of said hopper, a gage wheel adjustably mounted on said standards, a furrow opener, a draw bar therefor pivoted on said axle, an adjustable hanger bar for said furrow opener, a grain chute, a feed mechanism, a tappet disk mounted on said main wheel and provided with laterally projecting tappet pins, a tappet bar connected to said feed mechanism and adapted to coact with said tappet pins as the wheel revolves, a return spring for said feed mechanism, and an adjustable support on which the front end of the tappet bar is slidably mounted.

In witness whereof, I have hereunto set my hand and seal in the presence of two witnesses.

JOSEPH DICARLO [L. S.]

Witnesses:
  LUELLA G. GREENFIELD,
  MARGARET L. GLASGOW.